No. 724,151. PATENTED MAR. 31, 1903.
J. C. ANDERSON.
SPECTACLES.
APPLICATION FILED JAN. 27, 1903.
NO MODEL.
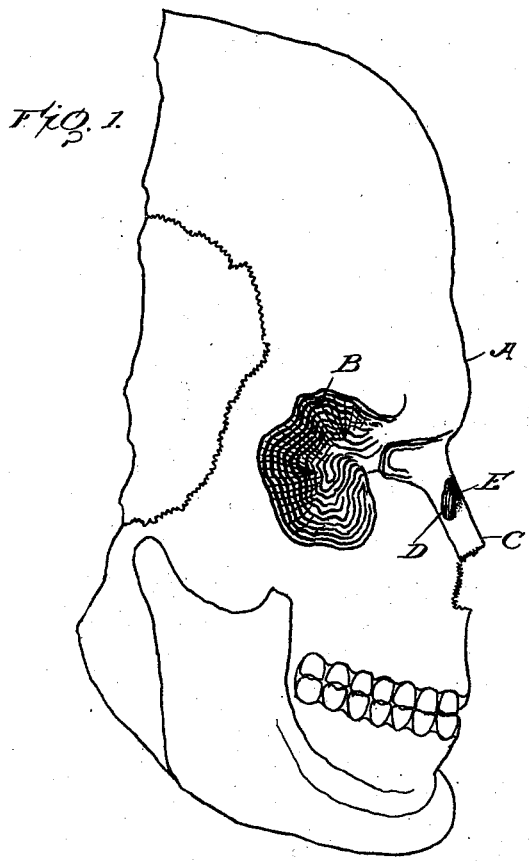
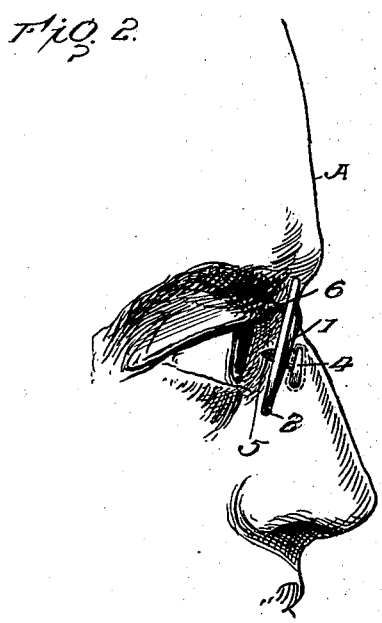
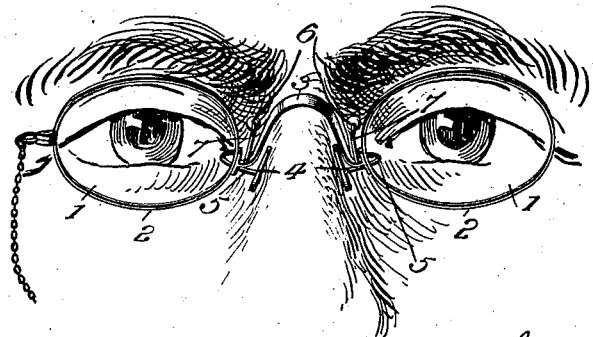
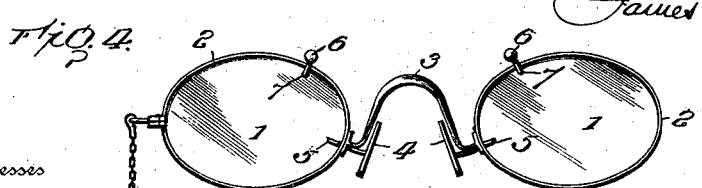
Witnesses
Henry C. Hazard.
Jno. J. Harrower.
James C. Anderson
Inventor
By Wm. C. McIntire
Attorney.

UNITED STATES PATENT OFFICE.

JAMES C. ANDERSON, OF HIGHLAND PARK, ILLINOIS.

SPECTACLES.

SPECIFICATION forming part of Letters Patent No. 724,151, dated March 31, 1903.

Application filed January 27, 1903. Serial No. 140,790. (No model.)

*To all whom it may concern:*

Be it known that I, JAMES C. ANDERSON, a citizen of the United States, residing at Highland Park, in the county of Lake and State of Illinois, have invented certain new and useful Improvements in Spectacles; and I do hereby declare the following to be a full, clear, and exact description of the invention, such as will enable others skilled in the art to which it appertains to make and use the same.

My invention relates to certain new and useful improvements in spectacles.

In the use of all aids to the vision it is of the utmost importance that the lenses should be held not only in fixed and constant relation with the eyes, but that in order that the field of vision may be as extensive as possible and all interference therewith should be reduced to the minimum it is essentially important that the lenses should occupy a plane as close to the eyes as possible without interfering with their natural movement within their orbits.

It is well known by those having occasion to aid any impairment or peculiarity of sight that the ordinary spectacles, having a rigid nose-bridge and side bows, are, for the reasons above stated, best adapted for use, because the lenses can be adjusted closer to the eyes and held in a more fixed and constant relation therewith than can be the case with what are known as "nose-glasses," which are held upon the nose under spring-pressure of "nose-pads," such spring-pressure being of necessity in proportion to the weight of the glasses and the peculiarity of formation of the nose of the wearer.

The comparative cumbrousness of the spectacles having bows and the tendency thereof to give to the wearer an elderly appearance has led to a preference for the spring nose-glasses, notwithstanding the disagreeable pinching effect and the tendency to produce varying and trying focuses of the eyes.

My invention has for its object to provide spectacles having all the advantages of the ordinary bow-spectacles without the concomitant disadvantage referred to, and while approaching in design and desirability to the nose-glasses shall also be devoid of the inherent disadvantages therein, as heretofore enumerated.

With these ends in view my invention consists of a pair of lenses, either with or without surrounding frames, connected together by a rigid nose-bridge adapted to be seated upon the nose of the wearer and provided with forwardly-projecting and vertically-disposed anchors adapted to be seated each side of the nose and within the cavities of the bone formation, whereby such anchors not only prevent any outward movement of the glasses, but also coöperate with the bridge-piece in sustaining the weight of the glasses.

My invention also consists in combining with the nose-bridge and anchors auxiliary means for preventing the accidental upward movement of the glasses after they have been properly located upon the nose.

My invention further consists in the details of construction by means of which the anchors and auxiliary devices, made of a given or standard size and design, may be readily adjusted to adapt them to varying anatomical formations, all as will be hereinafter more fully explained.

In order that those skilled in the art to which my invention appertains may know how to make the same and fully appreciate all the advantages thereof, I will proceed to describe the construction, referring by letters and figures to the accompanying drawings, in which—

Figure 1 represents a profile view of the skeleton or bone formation of the human head and showing clearly the natural cavities on each side of the bridge of the nose and the relation of the frontal bone and the orbits or eye-sockets to the nose-bridge and the said cavities each side thereof. This figure is designed to aid in the clear understanding of the advantages of the details in construction of my improved spectacles illustrated in the other figures and in order that the special relation of the several parts thereof to the anatomy of the human head may be fully appreciated. Fig. 2 is a front view of my improved spectacles in proper adjustment upon the nose. Fig. 3 is a side or profile view of the same; and Fig. 4 is a front view of the spectacles, showing a modification as to the location of the devices designed to prevent any accidental upward movement of the spectacles after they have been properly located upon the nose.

Similar characters of reference denote like parts in the several figures of the drawings.

Referring particularly to Fig. 1, A represents the frontal bone of the human skull. B represents the orbits or eye-sockets, and C the "nasal." The point of juncture between the frontal bone A and the nasal C constitutes the upper limit of what is denominated the "bridge" of the nose, and somewhat below this point and on each side of the bridge there are vertically-trending small cavities or depressions D, which produce vertically-trending projections or ribs E, as clearly illustrated by the shaded lines.

Referring now to the other figures of the drawings, 1 1 represent the lenses secured within the ordinary frames 2, which are connected by the usual bridge 3, adapted to rest upon the bridge of the nose at its upper extremity.

In the construction of rimless spectacles the nose-bridge may be connected in the ordinary or any desired manner directly to the lenses.

4 4 are what I denominate "anchors," connected either to the bridge 3 or to the rims 2, as the case may be, by attenuated and ductile "goosenecks" 5. I have adopted the term "anchors" for the express purpose of differentiating these devices from the ordinary "nose-guards," inasmuch as my improved anchors are designed to act in the capacity of anchors by reason of the location they are designed to occupy, as will be hereinafter explained. The anchors are of a design and proportion approximating the cavities or depressions D (shown at Fig. 1) on each side of the bridge of the nose, and the goosenecks 5 are of such formation and extent that by the use of any suitable tool they may be bent or manipulated to properly adjust the anchors with reference to the locality of the cavities or depressions D in the nose of the person for whose use the spectacles may be intended. As will be clearly seen by reference to the drawings, the anchors 4 project or are in advance of the plane of the lenses 1, so that when they rest upon the nose and within the cavities or depressions D on each side of the nasal bone the bridge 3 will be properly located upon the bridge of the nose and at the upper extremity thereof. In this position the bridge 3 constitutes the support for the spectacles, while the anchors 4 not only coöperate in such support and distribute the weight of the spectacles, but prevent the outward or forward movement of the same, as by reason of the comparative rigid and fixed relation of said anchors they cannot ride over the projection or ribs E of the nose formation, or, in other words, as the bridge 3 and anchors 4 are seated or saddled at right angles to each other it becomes necessary to lift the spectacles bodily in order to release the anchors from their seats within the cavities or depressions D before the spectacles can be removed from the nose. This being the case, it will be readily understood that the insubstantial weight of the spectacles is sufficient to keep them in the adjusted position upon the nose, and that as all the parts are in rigid relation with one another and the bone structure of the nose is likewise fixed the spectacles when once adjusted upon the nose remain in said adjustment and that there is no possibility of the lenses moving from their relative and horizontal position, and hence no unusual or trying strain is exerted upon the eyes of the wearer.

While under ordinary circumstances the construction described is adapted to secure and maintain the spectacles in proper position upon the nose, it may be necessary under abnormal conditions to prevent the accidental and upward movement of the spectacles, which would of necessity unseat the same, and I therefore provide the auxiliary devices 6, which consist of simple knobs connected by attenuated and ductile arms 7 with either the bridge 3 at or near its juncture with the lenses or the frames 2, and by reason of the attenuated and ductile arms 7 the knobs 6 may be so adjusted with reference to the bridge 3 and anchors 4 that when the bridge and anchors are properly located, as hereinbefore explained, the knobs 6 will lie within the orbits under the projecting frontal bone and beneath the brow, and thus brace the spectacles against upward movement. These knobs and their attenuated arms are preferably connected with the bridge 3 and are designed to be located under the brow adjacent to the bridge of the nose; but if the spectacles are provided with rims they may be attached at any desired locality on the upper portion of said rims within effective range of the bridge 3, as illustrated at Fig. 4.

Having described the construction and advantages of my improved spectacles, what I claim as new, and desire to secure by Letters Patent, is—

1. The lenses connected with their horizontal axes in proper relation, by an intermediate rigid and immovable bridge adapted to rest upon the bridge of the nose, in combination with forwardly-projecting and vertically-disposed anchors adapted to be seated within the vertical cavities of the nasal bone, whereby said anchors will prevent the outward movement of the spectacles, substantially as hereinbefore set forth.

2. In spectacles such as described, in combination with the lenses and a rigid connecting-bridge adapted to be seated upon the bridge of the nose, forwardly-projecting and vertically-disposed anchors secured in position by attenuated ductile arms capable of manipulation to adjust the anchors to permanent and fixed relation with the cavities in the nasal bone, substantially as hereinbefore set forth.

3. In spectacles such as described, in combination with the lenses and a rigid connecting-bridge intermediate of said lenses, forwardly-extended and vertically-disposed anchors adapted to be seated within the cavities of the nasal bone, and upwardly-extended guards adapted to contact with the upper boundary of the orbit-cavities to prevent accidental upward movement of the spectacles, substantially as hereinbefore set forth.

In testimony whereof I affix my signature in presence of two witnesses.

JAMES C. ANDERSON.

Witnesses:
D. G. STUART,
JNO. J. HARROWER.